March 1, 1966  E. T. MARTEN  3,237,671
ANTI-SKID DEVICE FOR DUAL WHEELS
Filed July 15, 1964  2 Sheets-Sheet 1
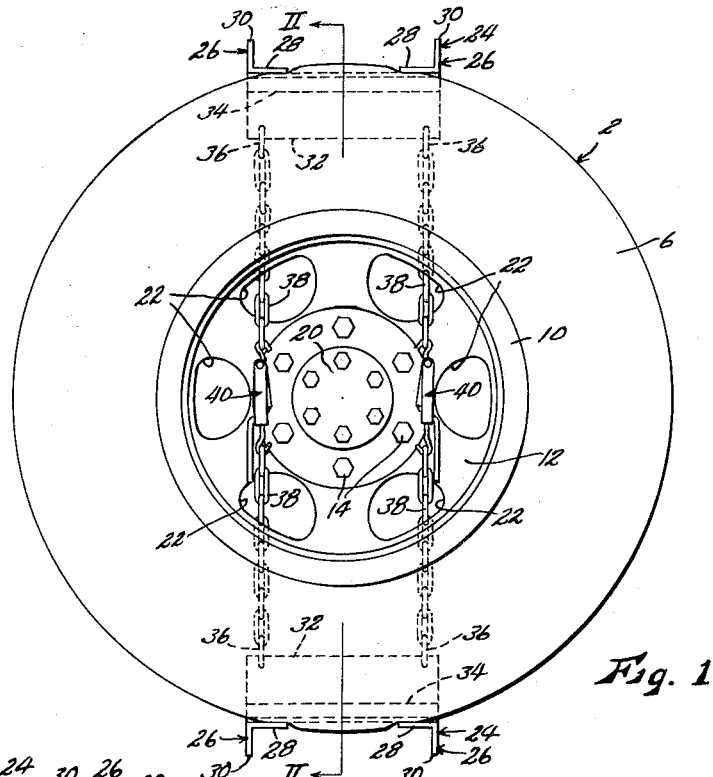
Fig. 1
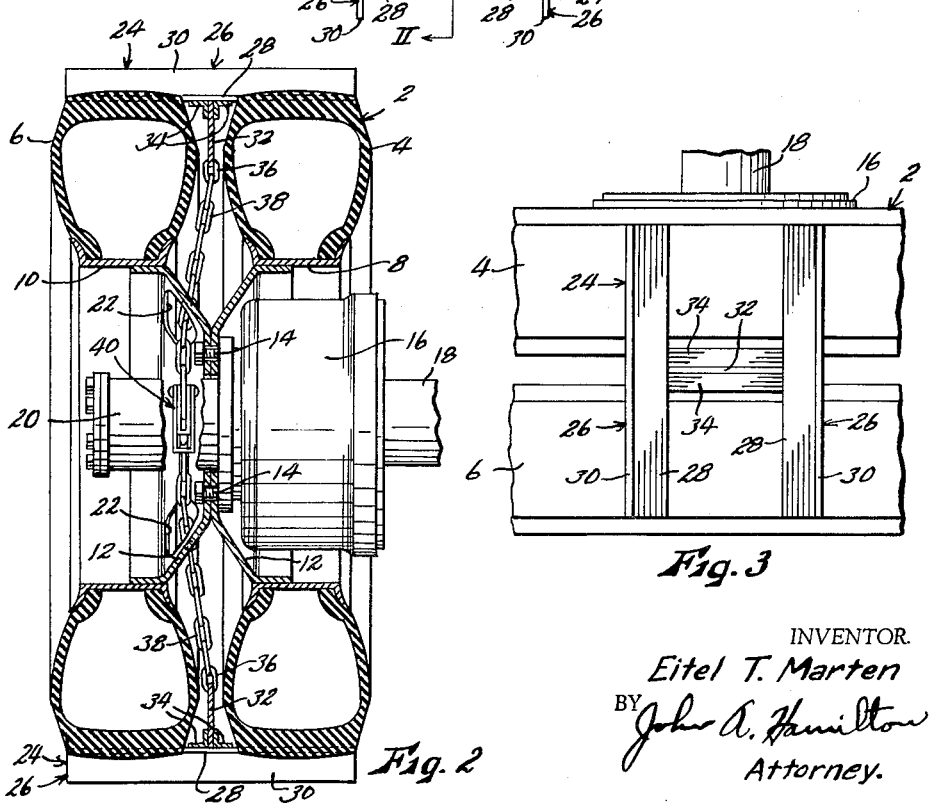
Fig. 2
Fig. 3
INVENTOR.
Eitel T. Marten
BY John A. Hamilton
Attorney.

March 1, 1966  E. T. MARTEN  3,237,671
ANTI-SKID DEVICE FOR DUAL WHEELS
Filed July 15, 1964  2 Sheets-Sheet 2

INVENTOR.
Eitel T. Marten
BY John A. Hamilton
Attorney.

United States Patent Office

3,237,671
Patented Mar. 1, 1966

3,237,671
ANTI-SKID DEVICE FOR DUAL WHEELS
Eitel T. Marten, Hope, Kans.
Filed July 15, 1964, Ser. No. 382,880
7 Claims. (Cl. 152—220)

This invention relates to new and useful improvements in anti-skid or traction devices for automotive vehicles, and has particular reference to such a device which is especially adapted for use with dual wheels such as are commonly used on heavy trucks.

The principal object of the present invention is the provision of a device of the character described which may be applied quickly and easily to a dual truck wheel, by a single operator, even if said wheel should already be deeply mired in mud, snow or the like. This is a substantial improvement over standard tire chains, which are extremely difficult and tedious to apply even under the best of circumstances.

Another object is the provision of a device of the character described constituting a plurality of cleats each of such angular extent, relative to the wheel, that it occupies only a small portion of the tread periphery, in order that one or more of said cleats may be applied to whatever portion of the wheel is not already mired, in order to provide traction for assisting the truck back to a solid roadway. The particular cleat shown is a mud cleat, suitable for use in mud or snow but not for use on a hard-surfaced roadway, but it could if desired be equipped with tread chains or the like to make it usable on hard but slick surfaces such as icy pavements.

Other objects are simplicity and economy of construction, efficiency and dependability of operation, and adaptability, without alteration or modification, for use on wheels of various types, sizes and constructions.

Figure 4:
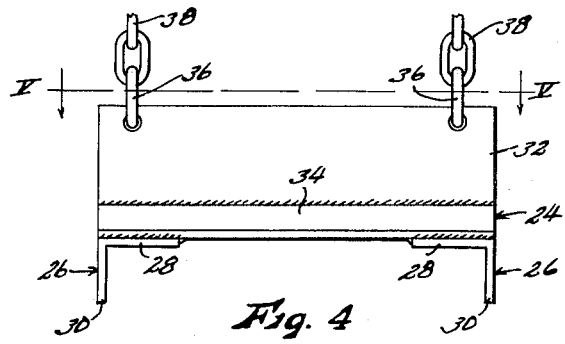
Figure 5:
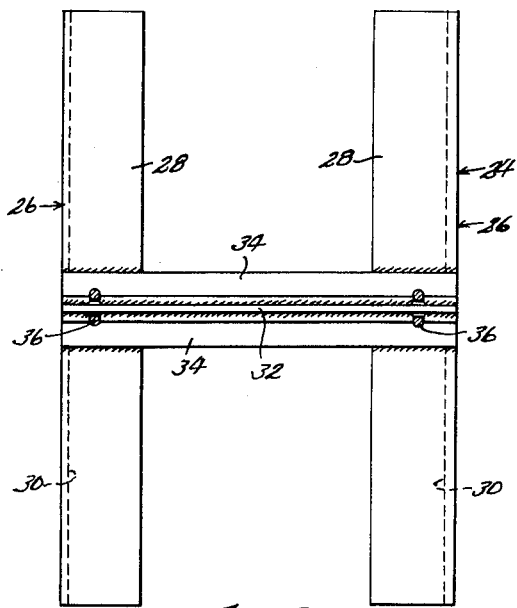
Figure 6:
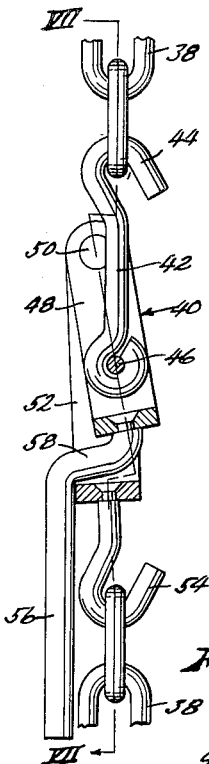
Figure 8:
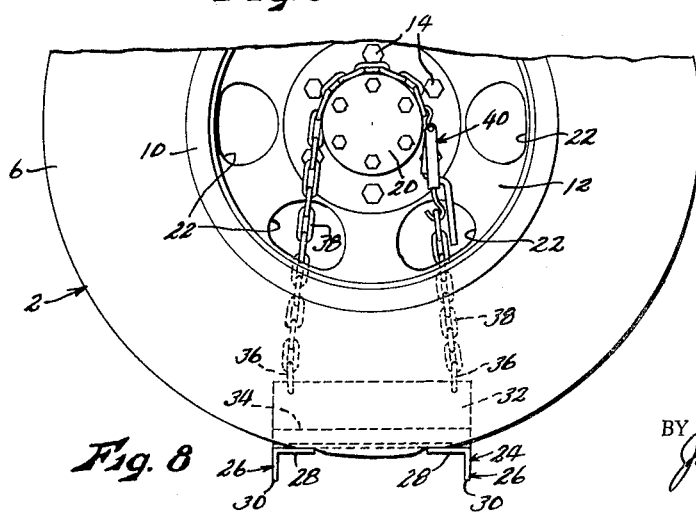
Figure 7:
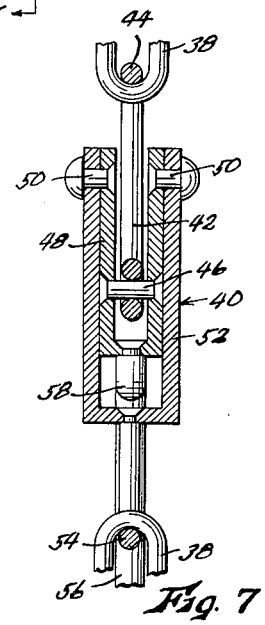

With these objects in view, as well as other objects which will appear in the course of the specification, reference will be had to the accompanying drawing, wherein:

FIG. 1 is a side elevational view of a dual truck wheel, having an anti-skid device embodying the present invention mounted operatively thereon, FIG. 2 is a sectional view taken on line II—II of FIG. 1, with parts left in elevation and partially broken away, FIG. 3 is a fragmentary top plan view of the wheel as shown in FIG. 1, showing a face view of one of the cleats, FIG. 4 is an enlarged side view of one of the cleats, FIG. 5 is a sectional view taken on line V—V of FIG. 4, FIG. 6 is an enlarged longitudinal sectional view of one of the chain tighteners, FIG. 7 is a slightly irregular sectional view taken on line VII—VII of FIG. 6, and FIG. 8 is a fragmentary view similar to FIG. 1, but showing a different mode of attachment of a single cleat to the wheel.

Like reference numerals apply to similar parts throughout the several views, and the numeral 2 applies generally to a dual truck wheel including an inner tire 4 and an outer tire 6 mounted respectively on coaxial side-by-side rims 8 and 10, each of said rims having a circular disc 12 welded or otherwise affixed therein. Said discs are oppositely and axially offset, in their central portions, so as to abut each other in a plane between the tires and at right angles to the wheel axis, and are detachably affixed, as by screws 14, to a brake drum assembly 16 carried by the truck axle 18. The brake drum is disposed principally within the rim 8 of the inner tire, and has a hub 20 disposed coaxially within the rim 10 of the outer tire. The disc 12 of at least the outer rim 10 has a series of holes 22 formed therethrough in angularly spaced relation about hub 20. The structure thus far described is of course common and well understood in the art.

The anti-skid device forming the subject matter of the present invention includes one or more cleats each indicated generally by the numeral 24, and each including a pair of traction bars 26 which extend across the tread surfaces of both tires 4 and 6 as shown, in a direction parallel to axle 18. Said bars are parallel and are spaced apart by any suitable distance, although a spacing of about one foot has been found satisfactory for wheels of most popular sizes. Each bar is of angle iron configuration, the legs 28 thereof being coplanar and adapted to lie against the tire treads, and the legs 30 thereof extending outwardly at right angles to legs 28. The midpoints of bars 26 are welded to one edge of a rectangular stabilizer plate 32, respectively at opposite ends thereof. Said stabilizer plate is disposed in a plane at right angles to the plane of traction bar legs 28, and at right angles to the longitudinal extent of said traction bars, so as to extend between tires 4 and 6 as best shown in FIG. 2, its plane being at right angles to axle 18. Said stabilizer plate is of sufficient width, radially of the wheel, to extend between the portions of the tires which are thickest in a direction parallel to the wheel axis. The connection between bars 26 and the stabilizer plate may be reinforced by a pair of angle irons 34 welded both to said bars and said stabilizer plate. A pair of chain links 36 are welded to the edge of plate 32 opposite to traction bars 26, respectively adjacent opposite ends thereof, and a length of chain 38 is connected in each of said welded links.

FIGS. 1 and 2 show a wheel to which two of cleats 24 are secured in diametrically opposite relation. In this mode of mounting, the chains 38 of each cleat are lead outwardly through appropriate holes 22 of disc 12 of outer rim 10, so as to be disposed at the easily accessible outer face of said disc, and each chain of each cleat is joined to the corresponding chain of the opposite cleat by a tightener indicated generally by the numeral 40. Said tightener, as detailed in FIGS. 6 and 7, includes an elongated shank 42 having at one end a hook 44 adapted to be engaged in any desired link of one of chains 38, and pivoted at its opposite end, as at 46, adjacent the closed end of a U-shaped lever 48, said lever being pivoted at its open end, as at 50, to the open end of a longer U-shaped lever 52. A hook 54 is affixed to the closed end of lever 52 and is adapted to be engaged in any desired link of the other chain 38 to be connected. Pivots 46 and 50 are parallel. A handle 56 is affixed to the closed end of lever 48, and is offset at 58 to permit lever 48 to enter into and through lever 52. It will be seen that if lever 48 is pivoted in a clockwise direction about pivot 50, as shown in FIG. 6, the spacing between hooks 44 and 54 will be increased, so that said hooks may be engaged easily in chains 38. Then lever 48 is pivoted in a counter-clockwise direction, by use of handle 56, thereby drawing hooks 44 and 54 closer together to pull chains 38 taut with great force. As the levers approach the relative position shown in FIG. 6, pivot 46 passes through a plane containing the axis of pivot 50 and hook 44, so that chain tension thereafter tends to continue rotation of lever 48 in a counter-clockwise direction, but said lever is restrained by the engagement of handle 56 with the closed end of lever 52. The tightener is thus "self-locking."

FIG. 8 shows a single cleat 24 mounted on the wheel. In this mode of mounting, the chains 38 of the single cleat are lead through holes 22 of wheel disc 12 as before, one of said chains being trained about wheel hub 20 and joined to the other chain by a tightener 40 as described above. Whether the cleats are applied as in FIG. 1 or as in FIG. 8, the tighteners 40 should be engaged in such links of chains 38 that when drawn tight, traction bars 26 are drawn into indenting relation with the tires 4 and 6 as shown, so that the chains will not go slack when the portions of the tires engaged by the cleats are compressed by contact with the ground. It will be understood that chains 38 may be of sufficient length to permit attachment either as in FIG. 1 or as in FIG. 8, and to permit attachment to wheels of maximum diameter, and then effectively shortened as may be required in any particular application by joining the tightener hooks 44 and 54 in any desired links of said chains.

Stabilizer plate 32, by its inclusion between the most closely spaced portions of the two tires 4 and 6, serves to prevent the cleats from turning or twisting about radial lines from the wheel axis during use, and thus keeps traction bars 26 properly oriented on the tire treads. Actually, the tire sidewalls bulge outwardly when the tire is compressed by ground contact, so as to press tightly against the opposite faces of plate 32, and thus tend to straighten the cleat in the event it should have become slightly canted. The cleats are prevented from sliding or "walking" peripherally around the tire treads during use by the insertion of chains 38 through holes 22 of the wheel disc, and also by the coplanar relationship of legs 28 of the traction bars. This coplanar relation, as clearly shown in both FIGS. 1 and 8, provides that the confronting or inner edges of said legs 28 are pressed further into indenting relation with the tire treads than their outer or distal edges, and hence that said legs are inclined relative to the tread, not tangent. Thus, referring to FIG. 8, it will be seen that if the wheel is turning in a clockwise direction, the inner edge of leg 28 of the left hand bar 26 tends to "dig" into the tire to prevent the cleat from sliding along the tire. On the other hand, if the wheel is turning in a counterclockwise direction, as in backing the truck, the inner edge of the leg 28 of the right hand bar 26 tends to "dig" into the tire.

The device is adapted for use with wheels of other constructions than that shown. For example, one popular type of truck wheel includes a cylindrical spacer ring coaxial with the wheel axis and extending between the rims of the two tires, whereby to space the two rims and prevent the entry of dirt, and mud therebetween. The present device could be used with such a wheel simply by cutting holes in the spacer ring for receiving chains 38.

As previously mentioned, the cleats as shown are intended for temporary use in assisting a truck which has become mired in a mudhole, snowbank or the like, the outwardly projecting legs 30 of the traction bars not being suitable for use on hard surfaced roadways. Two cleats applied as in FIG. 1, or even one cleat as in FIG. 8, are usually sufficient to get a truck out of a mudhole or snowbank, unless they are of unusual size and extent. More cleats could be applied if desired, either as in FIG. 1 or as in FIG. 8. The device also could be adapted for use on hard roadways, such as icy pavements, by omitting the outwardly projecting legs 30 of the traction bars, and applying relatively short "teeth" or other projections directly to legs 28, or by extending tread chains between the ends of each leg 28 so as to traverse the treads of the tires.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. An anti-skid device for dual wheels having axially spaced apart rims and tires and a wheel disc in each of said rims, the outer of said discs having openings formed therein, said anti-skid device comprising:

(a) a cleat comprising a plurality of parallel spaced apart traction bars adapted to extend laterally across and to span the treads of both of said tires, each of said traction bars including a generally planar tread-engaging element and a traction element extending outwardly from said tread-engaging element, and a connecting member rigidly joining said traction bars at their midpoints and adapted to be disposed between said tires, (b) elongated flexible strands each attached at one end to said connecting member and adapted to extend between said rims and through the openings of said outer disc to the outer face of said disc, and (c) securing means for connecting the opposite ends of said strands to elements having a fixed relation to said wheel.

2. An anti-skid device as recited in claim 1 wherein said traction element of each traction bar comprises a rigid flange affixed to and extending outwardly from the the tread-engaging element of said bar.

3. An anti-skid device as recited in claim 1 wherein each of said traction bars is of angle iron form, one leg thereof forming said tread-engaging element and the other leg thereof forming said traction element.

4. An anti-skid device as recited in claim 1 wherein the tread-engaging surfaces of said traction bars lie in a single plane, whereby as a result of the spaced apart relation of said bars said surfaces cannot lie flat or tangent to the tread surface, but are inclined relative to said tread surface, the contiguous edges thereof being disposed closer to the wheel axis than the distal edges thereof.

5. An anti-skid device as recited in claim 4 wherein said securing means is operable to tension said flexible strands whereby to draw said traction bars into indenting relation to the treads of said tires.

6. An anti-skid device as recited in claim 1 wherein said connecting member comprises a flat plate rigidly connected to said traction bars at right angles thereto whereby to be disposed between said tires in a plane at right angles to the wheel axis, said plate being of sufficient width, radially of the wheel, to extend between the thickest and most closely spaced portions of said tires, whereby to act as a stabilizer securing said traction bars in properly oriented relation to the treads of said tires.

7. An anti-skid device as recited in claim 1 wherein each of said flexible strands constitutes a linked chain, and wherein said securing means includes a hook adapted to be inserted selectively in any desired link of said chain for connecting said chain and securing means, whereby to vary the effective length of said chain to adapt the device for use on wheels of different sizes and styles.

References Cited by the Examiner

UNITED STATES PATENTS

| | | | |
|---|---|---|---|
| 1,529,558 | 3/1925 | Staggers | 152—232 X |
| 1,600,588 | 9/1926 | Hipkins | 152—220 |
| 2,669,274 | 2/1954 | Mullan | 152—223 |
| 2,947,337 | 8/1960 | Ambeau | 152—220 |

FOREIGN PATENTS 104,430   6/1938   Australia.

ARTHUR L. LA POINT, *Primary Examiner.*

C. W. HAEFELE, *Assistant Examiner.*